(12) United States Patent
Nozu (10) Patent No.: US 6,868,510 B1
(45) Date of Patent: Mar. 15, 2005

(54) TERMINAL WITH CORRECTIVE MAINTENANCE IN ACCORDANCE WITH SELECTED MODE

(75) Inventor: Takashi Nozu, Tokyo (JP)

(73) Assignee: NEC Corporation, Tokyo (JP)

( * ) Notice: Subject to any disclaimer, the term of this patent is extended or adjusted under 35 U.S.C. 154(b) by 566 days.

(21) Appl. No.: 09/667,324

(22) Filed: Sep. 22, 2000

(30) Foreign Application Priority Data

Sep. 24, 1999 (JP) .......................................... 11-270892

(51) Int. Cl.$^7$ .............................................. G06F 11/00
(52) U.S. Cl. ............................. 714/48; 714/23; 714/44
(58) Field of Search .............................. 714/48, 44, 23

(56) References Cited

U.S. PATENT DOCUMENTS

| | | | | |
|---|---|---|---|---|
| 5,506,990 A | * | 4/1996 | Holman, Jr. ................ | 713/300 |
| 5,526,267 A | * | 6/1996 | Sogawa ........................ | 714/23 |
| 5,568,608 A | * | 10/1996 | Shannon ...................... | 714/44 |
| 5,627,964 A | * | 5/1997 | Reynolds et al. ............. | 714/46 |
| 6,061,810 A | * | 5/2000 | Potter ........................... | 714/23 |
| 6,314,532 B1 | * | 11/2001 | Daudelin et al. ............. | 714/38 |
| 6,523,140 B1 | * | 2/2003 | Arndt et al. .................. | 714/44 |
| 2001/0027537 A1 | * | 10/2001 | Nada et al. ................... | 714/23 |

FOREIGN PATENT DOCUMENTS

| | | |
|---|---|---|
| JP | 56-215684 | 7/1983 |
| JP | 59-8062 | 1/1984 |
| JP | 8-30474 | 2/1996 |

OTHER PUBLICATIONS

Windows 2000 Safe–Mode Boot and Recovery Console White Paper, 2000, Microsoft Corporation, pp. 1–13.*
Microsoft Knowledge Base Article–122051, How Windows 95 Performs a Safe–Mode Start, 2003, Microsoft Corporation, pp. 1–2.*

* cited by examiner

*Primary Examiner*—Robert Beausoliel
*Assistant Examiner*—Michael Maskulinski
(74) *Attorney, Agent, or Firm*—Foley and Lardner LLP (57) ABSTRACT

The terminal deals effectively with an error occurrence in accordance with a selected one of modes that comprise a normal mode and a debug mode. The terminal comprises a mode information holder, an error detector, a mode judge unit and a initializer. The mode information holder holds mode information that indicates which mode is the selected mode. For example, the holding of the mode information is carried out ahead of supplying power to the terminal. When an error occurs in the terminal, the error detector detects the error. Then the mode judge unit judges which mode is the selected mode, by referring to the mode information so as to produce an initialization request if the normal mode is the selected mode. The initializer initializes the terminal in response to the initialization request. On the other hand, the mode judge unit does not produce the initialization request if the debug mode is the selected mode. Accordingly, the initializer does not initialize the terminal so that the terminal continues to malfunction from the error.

8 Claims, 11 Drawing Sheets

FIG.1

Operational Mode

| Value | Mode |
|---|---|
| 0 | Debug Mode |
| 1 | Normal Mode |

Operational Mode

| SW Condition | Mode |
|---|---|
| OFF | Debug Mode |
| ON | Normal Mode |

Memory State

| SW Condition | Mode (Mem. State) |
|---|---|
| OFF | Release |
| ON | Hold |

Operational Mode

| SW Condition | Mode |
|---|---|
| OFF | Debug Mode |
| ON | Normal Mode |

Reduction Request

| SW Condition | Mode |
|---|---|
| OFF | Inactive (Removed) |
| ON | Active (Remain) |

TERMINAL WITH CORRECTIVE MAINTENANCE IN ACCORDANCE WITH SELECTED MODE

BACKGROUND OF THE INVENTION

This invention relates to a terminal and, in particular to corrective maintenance for the terminal.

There are various kinds of terminals, which are for example facsimile devices, copy machines, printers, or computers. Each of terminals has multiple functions to provide an operator with a normal operation which characterizes the terminal. On the other hand, most of terminals are similar to other terminals in construction that is the combination of hardware units and software instructions, where hardware units include a processor or a CPU and a memory while software instructions include a control module enabling the processor to serve as a controller of a normal operation.

During the normal operation, errors that are caused by noise and so on might occur in the terminal. If occurring, the errors terminate one or more functions of the terminal. In particular, the critical error forces the entire normal operation of the terminal to freeze.

In order to recover the functions or the normal operation, the terminals have corrective maintainers or recovery systems. In detail, a conventional one of the corrective maintainers always reboots the terminal and restarts the normal operation entirely, when detecting the error occurrence in the terminal. Such conventional corrective maintainer is disclosed in Japanese Unexamined Patent Publication No. Hei 8-30474.

However, the rebooting or the restarting is not always effective means for correcting the error. For example, if the error is a software error, the terminal may get back the normal operation by the rebooting. On the other hand, if the error is not corrected by clearing the memory of the terminal or the error is a hardware error, the terminal might not get back the normal operation by the rebooting. In this event, the rebooting puts the terminal into the endless loop, because the error is repeatedly detected whenever the rebooting is carried out.

SUMMARY OF THE INVENTION

It is therefore an object of the present invention to provide a terminal which deals effectively with an error occurring in the terminal itself.

According to one aspect of the present invention, a terminal deals effectively with an error occurrence in accordance with a selected one of modes that comprise a normal mode and a debug mode. The terminal comprises a mode information holder, an error detector, a mode judge unit and a initializer. The mode information holder holds mode information that indicates which mode is the selected mode. For example, the holding of the mode information is carried out ahead of supplying power to the terminal or during the normal operation. When an error occurs in the terminal, the error detector detects the error. Then the mode judge unit judges which mode is the selected mode, by referring to the mode information so as to produce an initialization request if the normal mode is the selected mode. The initializer initializes the terminal in response to the initialization request. On the other hand, the mode judge unit does not produce the initialization request if the debug mode is the selected mode. Accordingly, the initializer does not initialize the terminal so that the terminal continues to malfunction as caused by the error.

With such structure, the operator can select the mode of the terminal and can discover a cause of the error if selecting the debug mode, by the use of an external debugger. In addition, the debug mode prevents the terminal from being put into the endless loop, because the initialization is not carried out if the debug mode is selected.

DESCRIPTION OF THE PREFERRED EMBODIMENTS

Figure 1:
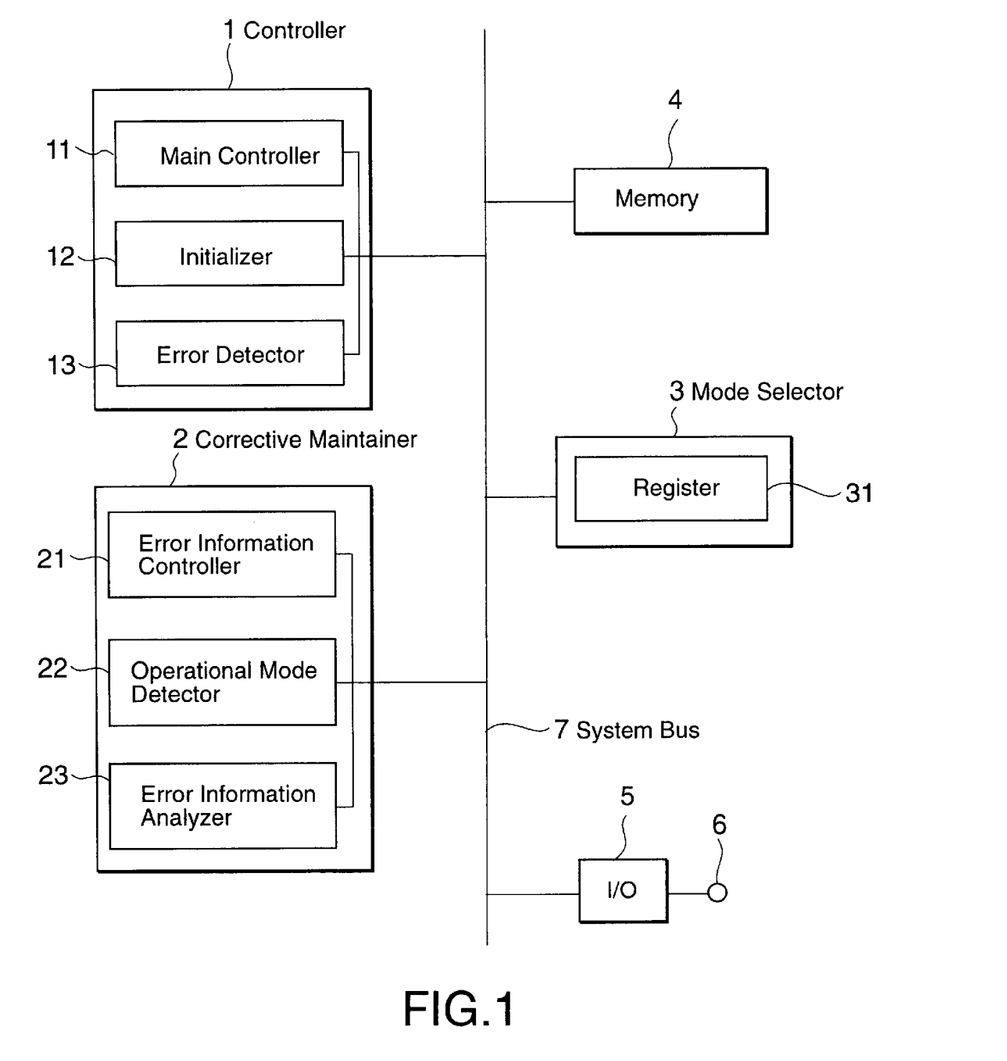
FIG. 1 is a block diagram schematically showing a terminal according to a first embodiment of the present invention.
Figure 2:
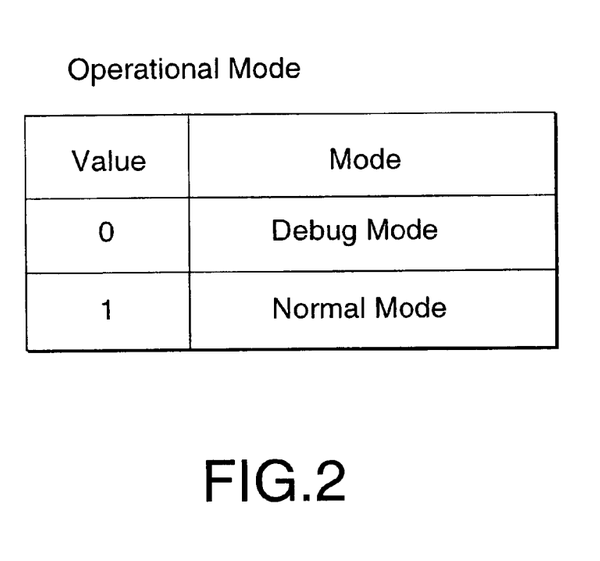
FIG. 2 is a table showing an operational mode of the terminal illustrated in FIG. 1.

In FIG. 1, a terminal according to a first embodiment of the present invention is schematically shown. In the terminal, a controller 1, a corrective maintainer 2, a mode selector 3, a memory 4, an input/output interface (I/O) 5 having a connector ( or a connection port ) 6 are configured to a system bus 7. The illustrated mode selector 3 comprises a register 31 which can store, as a flag, an operational mode selected from a debug mode and a normal mode. As shown in FIG. 2, the selected operational mode is the normal mode if a value of the flag is "1", while the selected operational mode is the debug mode if a value of the flag is "0." For example, the selected operational mode is set into the register 31 ahead of supplying power or during the normal operation of the terminal. The illustrated memory 4 is not cleared by an initialization but is cleared by a specified instruction, as long as a power is supplied thereto. The memory 4 may comprise a DRAM (Dynamic Random Access Memory) or BBRAM (Battery Backup Random Access Memory). The memory 4 may be nonvolatile memory, for example, an EEPROM (Electrically Erasable Programmable Read Only Memory) or a flash memory. The input/output interface 5 enables an outer device (not shown) connected to the connector 6 to reside on the system bus. For example, the outer device may be an outer analyzer or a debug tool.

In detail, the controller 1 comprises a main controller 11, an initializer 12 and an error detector 13. The main controller 11 controls a normal operation of the terminal. The initializer 12 initializes the terminal and starts the normal operation of the terminal when the power is supplied to the terminal or when the terminal is rebooted. In detail, the initialization carried out by the initializer 12 comprises two phase of a first initialization phase and a second initialization phase. The initialization of the first initialization phase must be carried out soon after power is supplied to the terminal, while the initialization of the second initialization phase may be carried out till the main controller 11 starts to control the normal operation. The error detector 13 periodically monitors the terminal to judge whether or not an error occurs in the terminal.

The corrective maintainer 2 comprises an error information controller 21, an operational mode detector 22 and an error information analyzer 23. The error information controller 21 controls error information which comprises a type of an error, date and time when the error occurs, a location where the error occurs, and so forth. In detail, the error information controller 21 writes an error information into the memory 4 when the error detector 13 detects an error. The operational mode detector 22 refers to the register 31 and detects the selected mode when the error detector 13 detects an error. That is, the operational mode detector 22 is for judging which operational mode is the selected mode with reference to the flag stored in the register 31, and is thus called a mode judge unit. The error information analyzer 23 analyzes an error on the basis of an error information stored in the memory 4, and produces detailed error information. In addition, the error information analyzer 23 notifies the detailed error information to an outer analyzer which is connected with the terminal when an error is analyzed, but is not shown.

Figure 3:
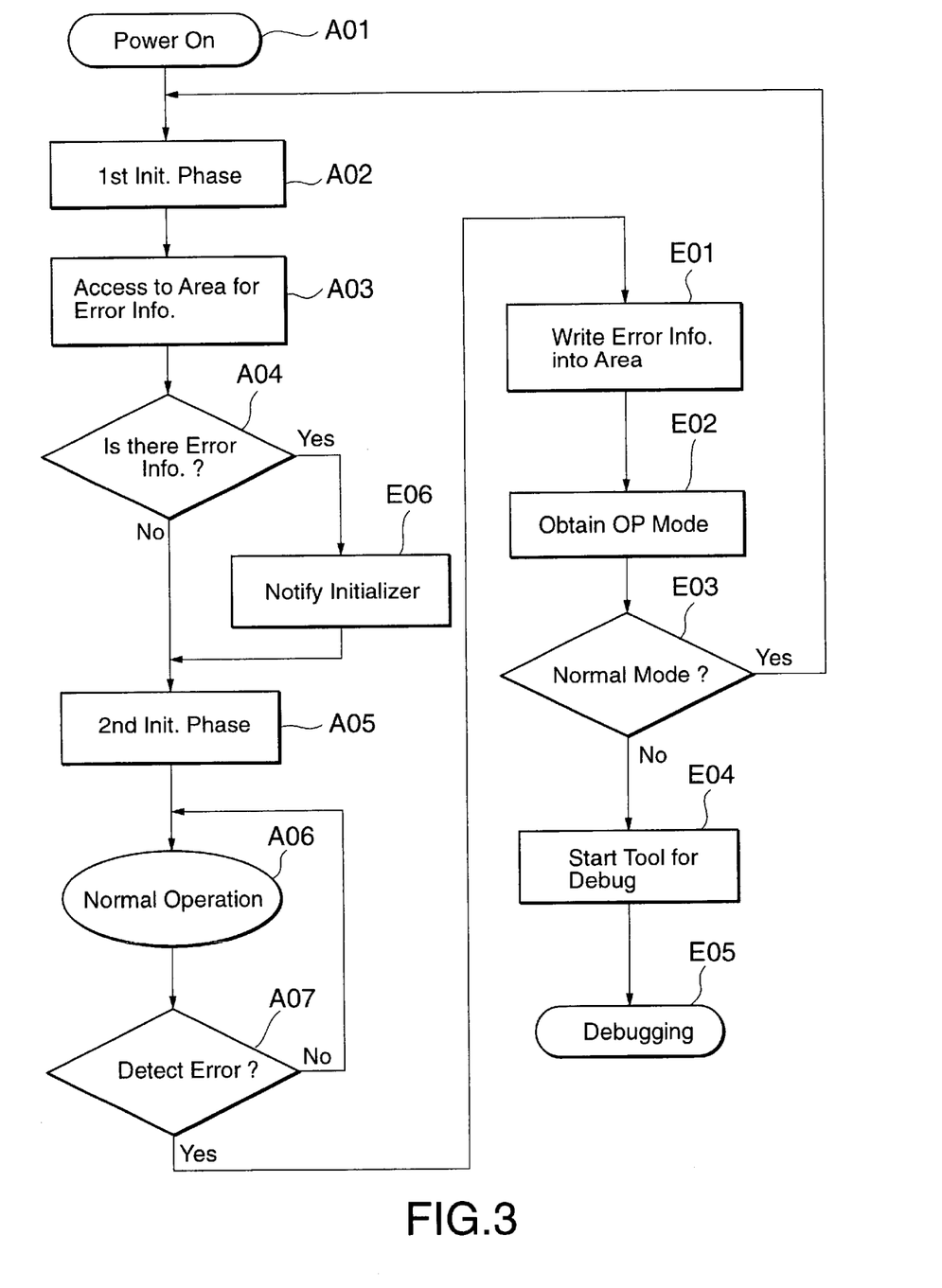
FIG. 3 is a flowchart for use in describing of the terminal illustrated in FIG. 1.

Now, an explanation made about an operation of the above-mentioned terminal, with reference also to FIG. 3. In the following explanation, the normal stating process is at first described, and then the error corrective maintenance and so on are described.

When the power is supplied to the terminal (Step A01), the initializer 12 carries out the first initialization phase (Step A02). For example, the first initialization phase may be an initialization of an operating system (OS) an initialization of an LCD display, or the like. After carrying out the first initialization phase, the initializer 12 notifies the error information analyzer 23 of the completion of the first initialization phase.

The error information analyzer 23 accesses to an area which is located in the memory 4 and is assigned for an error information (Step A03), so as to judge whether or not an error information is stored in the area (Step A04). In the starting process, the judgement results in "No." The judgement is told the initializer 12, so that the initializer 12 carries out the second initialization phase (Step A05). For example, the application software is initialized in the second initialization phase.

After carrying out the second initialization phase, the initializer 12 informs the completion of the second initialization phase to the main controller 11. Responsive to the information, the main controller 11 controls the normal operation (Step A06).

During the normal operation, the error detector 13 periodically monitors the terminal and judges whether or not an error occurs in the terminal (Step A07). As the result of judgement, if detecting an error occurrence, the error detector 13 notifies the error information controller 21 of the error information relating to the error. Responsive to the notification, the error information controller 21 writes the error information about the error into the area secured in the memory 4 (Step E01), and then tells the operational mode detector 22 the completion of the writing.

The operational mode detector 22 obtains the operational mode stored in the register 31 (Step E02) and judges whether or not the selected operational mode is the normal mode (Step E03). As the result of judgement, if the selected operational mode is the normal mode, the operational mode detector 22 produces an initialization request and notifies the initializer 12 of the initialization request.

Turning to Step A02, the initializer 12 executes the first initialization phase in response to the initialization request of the operational mode detector 22. Then, the error information analyzer 23 accesses to the area for the error information (Step A03), and judges whether or not an error information is stored in the area (Step A04). In this event, the judgement results in "Yes," because this sequence is carried out after the detection of the error. Therefore, the error information analyzer 23 goes to Step E06, and notifies the error occurrence to the initializer 12, Responsive to the notification of the error occurrence, the initializer 12 carries out the second initialization phase with clearing of the memory 4 (Step A05). Then the controller 11 controls the normal operation, while the error detector 13 periodically monitors the terminal (Steps A06 and A07).

On the other hand, the operational mode detector 22 does not produce the initialization request if the selected mode is the debug mode in accordance with the judgement at Step E03. Therefore, the initializer 12 also does not carries out the first initialization phase, so that the terminal is kept in trouble due to the error. In addition, the operational mode detector 22 informs the operator the error occurrence, for example, by the use of an LED lamp. In this condition, the operator can connect the outer analyzer with the terminal, in order to analyze the error. For example, the outer analyzer comprises a computer system where analysis software is executed. The analysis software may be software which can analyze core dumped on the memory, or be a debugger. The operator starts the analysis software and carries out the debugging (Steps E04 and E05). Specifically, the error information analyzer 23 reads the error information out of the area to analyze the error on the basis of the error information. Then the error information analyzer 23 produces detailed error information as the result of the analysis and notifies the detailed error information to the outer analyzer. Thus the operator can chase a cause of the error by the use of the outer analyzer, if selecting the debug mode.

Now, a description will be made about a terminal according to a second embodiment of the present invention, with reference to FIGS. 4 and 5.

Figure 4:
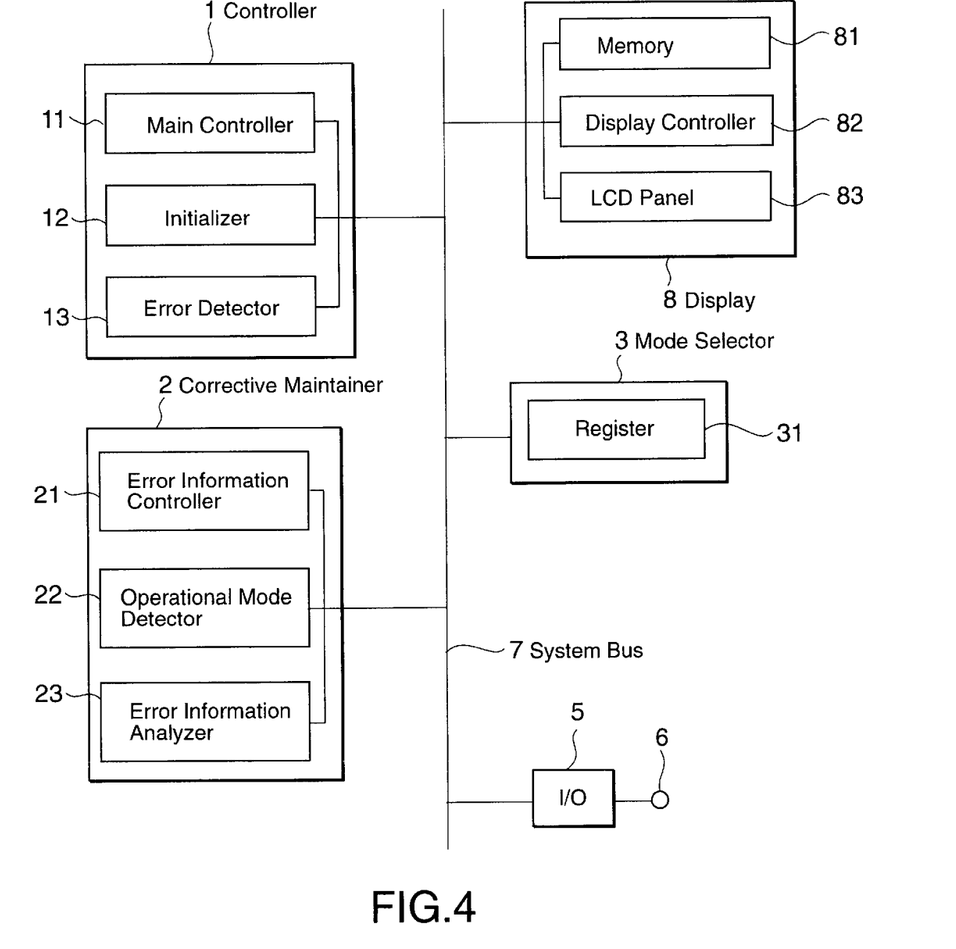
FIG. 4 is a block diagram schematically showing a terminal according to a second embodiment of the present invention.
Figure 5:
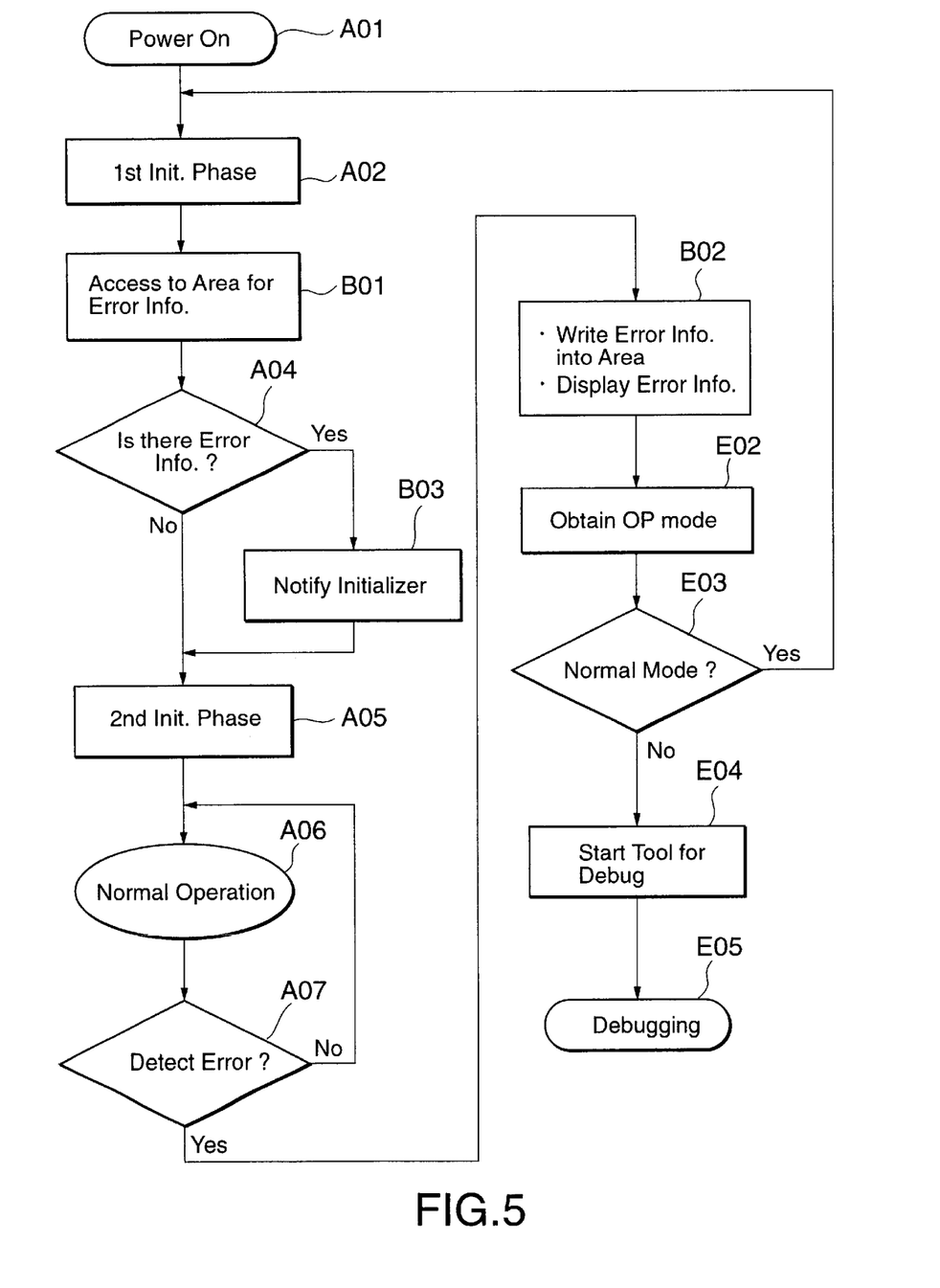
FIG. 5 is a flowchart for use in describing of the terminal illustrated in FIG. 4.

Referring to FIG. 4, the terminal according to the second embodiment is a modification of the first embodiment. In detail, the terminal according to the second embodiment comprises a display 8 instead of the memory 4. The display 8 comprises a memory 81, a display controller 82 and an LCD panel 83. The memory 81 is a frame memory and stores bitmap to be an image displayed on the LCD panel 83. In this embodiment, the memory 81 also serves as the memory 4 of the first embodiment, although the data format of the memory 81 is different from one of the memory 4.

Now an explanation will be made about an operation of the terminal according to the second embodiment, with reference to FIG. 5.

In the second embodiment, the normal starting process is carried out in the same way of the first embodiment. When the power is supplied to the terminal (Step A01), the initializer 12 carries out the first initialization phase (Step A02). When the initializer 12 notifies the error information analyzer 23 of the completion of the first initialization phase, the error information analyzer 23 accesses to an area which is located in the memory 81 and is assigned for an error information (Step B01), so as to judge whether or not an error information is stored in the area (Step A04). In the starting process, the judgement results in "No." The judgement is told to the initializer 12, so that the initializer 12 enters in the second initialization phase (Step A05). After the second initialization phase, the main controller 11 controls the normal operation (Step A06).

During the normal operation, the error detector 13 periodically monitors the terminal and judges whether or not an error occurs in the terminal (Step A07). As the result of judgement, if detecting an error occurrence, the error detector 13 notifies the error information controller 21 of the error information relating to the error. Responsive to the notification, the error information controller 21 writes the error information about the error into the area secured in the memory 81 (Step B02). In addition, the error information controller 21 tells the completion of the writing to the operational mode detector 22 and the display controller 82. The display controller 82 controls the LCD panel 83 to visually display the error information of the memory 81 on the LCD panel 83. That is, the display 8 serves to inform the operator a warning in relation to the error.

The operational mode detector 22 obtains the operational mode stored in the register 31 (Step E02), and judges whether or not the flag in the register 31 indicates the normal mode (Step E03). As the result of judgement, if the flag indicates the normal mode, the operational mode detector 22 outputs an initialization request into the initializer 12.

When receiving the initialization request, the initializer 12 executes the first initialization phase (Step A02) then the error information analyzer 23 accesses to the area for the error information (Step B01), and judges whether or not an error information is stored in the area (Step A04). In this event, the judgement results in "Yes," so that the error information analyzer 23 notifies the error occurrence We the initializer 12 (Step B03).

Responsive to the notification of the error occurrence, the initializer 12 caries out the second initialization phase with clearing of the memory 81 (Step A05). As the result of clearing, the error information displayed o the display 8 is deleted. Then the controller 11 controls the normal operation, while the error detector 13 periodically monitors the terminal (Steps A06 and A07).

On the other hand, the operational mode detector 22 does not produce the initialization request if the selected mode is the debug mode in accordance with the judgement in Step E03). Therefore the initializer 12 also does not carries out the first initialization phase, so that the terminal is kept in trouble due to the error.

In this embodiment, the display 8 has visually displayed the error information on the LCD panel 83 (Step B02), and thereby, the operator has recognized the error occurrence. In this condition, the operator can connect the outer analyzer with the terminal, and can analyze the error, as the same manner of the first embodiment.

Figure 7:
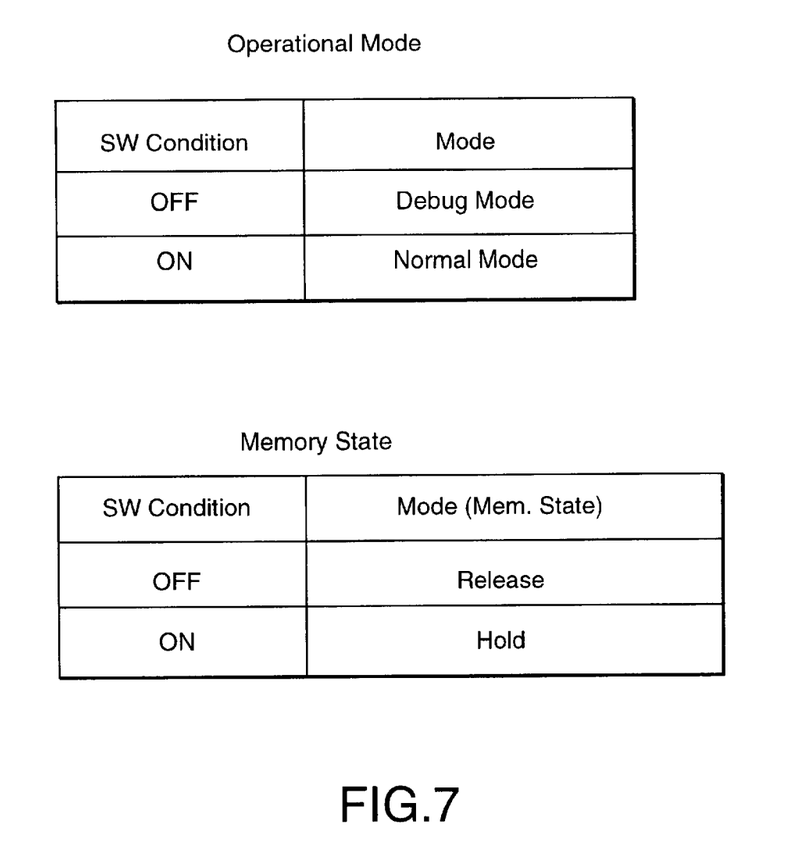
FIG. 7 is tables showing an operational mode and a memory state in the terminal illustrated in FIG. 6.
Figure 8:
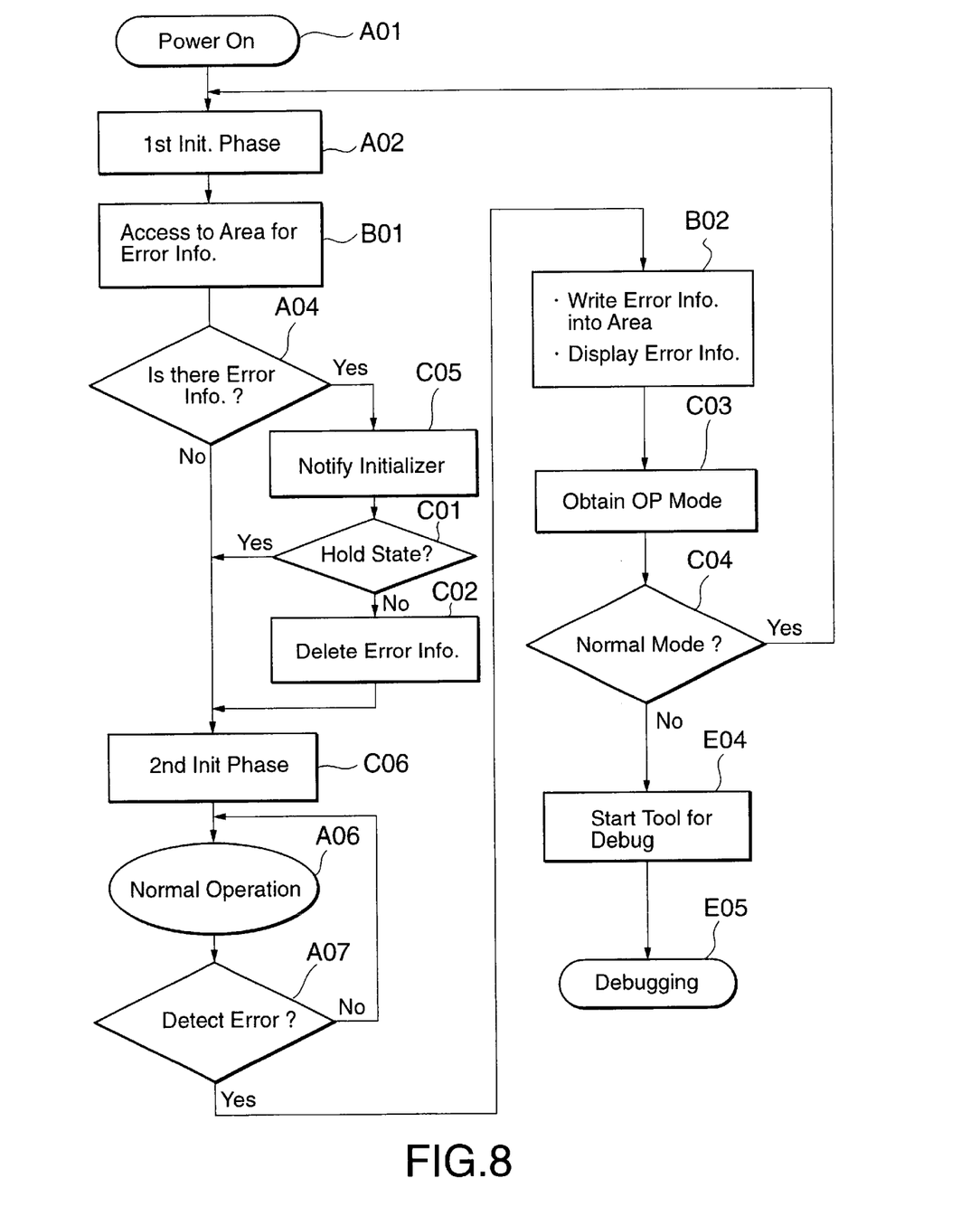
FIG. 8 is a flowchart for use in describing of the terminal illustrated in FIG. 6.

Now, a description will be made about a terminal according to a third embodiment of the present invention, with reference to FIGS. 6 through 8.

Figure 6:
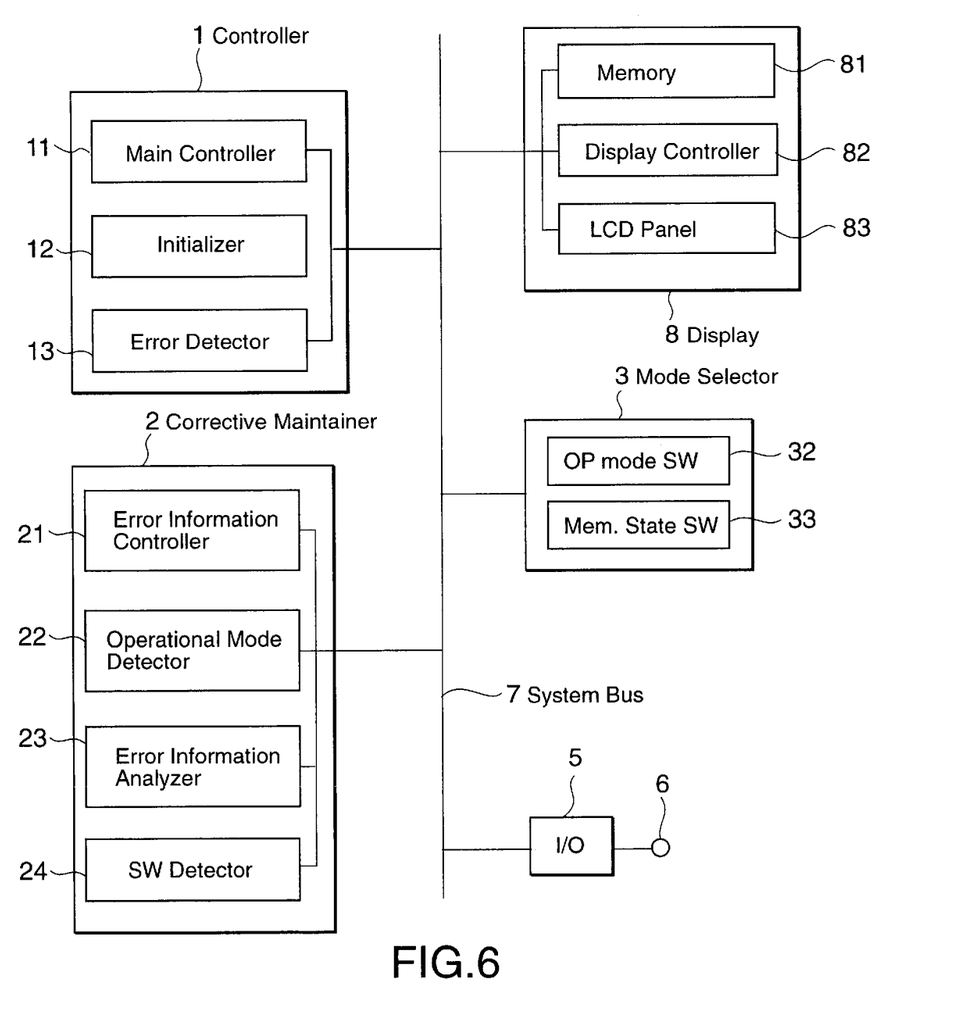
FIG. 6 is a block diagram schematically showing a terminal according to a third embodiment of the present invention.

Referring to FIG. 6, the terminal according to the third embodiment is a modification of the second embodiment. In detail, the terminal according to the third embodiment comprises a mode selector 3 hazing an operational mode switch 32 and a memory state switch 33. As shown in FIG. 7, the operational mode switch 32 is for switching between two switch conditions which indicate the normal mode and the debug mode, respectively. That is, the operational mode switch 32 is equivalent to the register 31 of the first embodiment. As also shown in FIG. 7, the memory state switch 33 is adapted to switch between two switch conditions which indicate a release state and a hold state, respectively. The release state and the hold state are memory states. The initializer 12 releases the memory 81 from storing the error information if the memory state is the release state, while the initializer 12 keeps the memory 81 storing the error information if the memory state is the hold state. These switches 32 and 33 can be manually switched by the operator. The switch detector 24 is for detecting the switch condition of the memory state switch 33.

Now, an explanation will be made about an operation of the terminal according to the third embodiment, with reference to FIG. 8.

In this embodiment, the normal starting process is carried out in the same way of the first embodiment. When the power is supplied to the terminal (Step A01), the initializer 12 carries out the first initialization phase (Step A02). When the initializer 12 notifies the error information analyzer 23 of the completion of the first initialization phase, the error information analyzer 23 accesses to the area assigned for an error information (Step B01). Then the error information analyzer 23 judges whether or not an error information is stored in the area (Step A04). In the starting process, the judgement results in "No." The judgement is informed to the initializer 12, so that the initializer 12 carries out the second initialization phase (Step C06). After the initializer 12 carries out the second initialization phase, the main controller 11 controls the normal operation (Step A06).

During the normal operation, the error detector 13 periodically monitors the terminal and judges whether or not an error occurs in the terminal (Step A07). As the result of judgement, if detecting an error occurrence, the error detector 13 notifies the error information controller 21 of the error information relating to the error. Responsive to the notification, the error information controller 21 writes the error information about the error in the area secured in the memory 81 (Step B02). In addition, the error information controller 21 informs the completion of the writing to the operational mode detector 22 and the display controller 82. The display controller 82 controls the LCD panel 83 to visually display the error information of the memory 81 on the LCD panel 83.

The operational mode detector 22 detects the switch condition of the operational mode switch 32 to obtain the operational mode (Step C03), and judges whether or not the selected operational mode is the normal mode (Step C04). As the result of judgement if the operational mode switch 32 indicates the normal mode, the operational mode detector 22 produces an initialization request to notify the initializer 12 of the initialization request.

In response to the initialization request, the initializer 12 executes the first initialization phase (Step A02). Then, the error information analyzer 23 accesses to the area for the error information (Step B01), and judges whether or not an error information is stored in the area (Step A04). In this event, the judgement results in "Yes," so that the error information analyzer 23 goes to Step C05 to notify the error occurrence to the initializer 12 and the switch detector 24.

When receiving the notification of the error occurrence, the switch detector 24 detects the switch condition of the memory state switch 33, so as to judge whether or not the memory state is the hold state (Step C01). If the memory state is not the hold state but is the release state, the initializer 12 deletes the error information from the memory 81 to clear the memory 81 (Step C02). Otherwise, the initializer 12 does not delete the error information (referring to Step C01).

Then the initializer 12 carries out the second initialization phase (Step C06). It is noted here that the second initialization phase of this embodiment is different from ones of the first and second embodiments, in accordance with the existence of the memory state switch 33. The second initialization phase of the third embodiment does not include the deleting of the error information, while the second initialization phases in the first and second embodiments include the deleting of the error information. That is, the operator can select whether or not the memory 81 holds the error information in the third embodiment although the error information is automatically deleted in the foregoing first and second embodiments.

After the second initialization phase, the controller 11 controls the normal operation (Step A06), and the error detector 13 periodically monitors the terminal (Step A07).

As for the case where the selected mode is the debug mode in the judgement of Step C03, the terminal according to the third embodiment operates in the same manner of the second embodiment. In this connection, the operator can behave as disclosed in the second embodiment.

Figure 10:
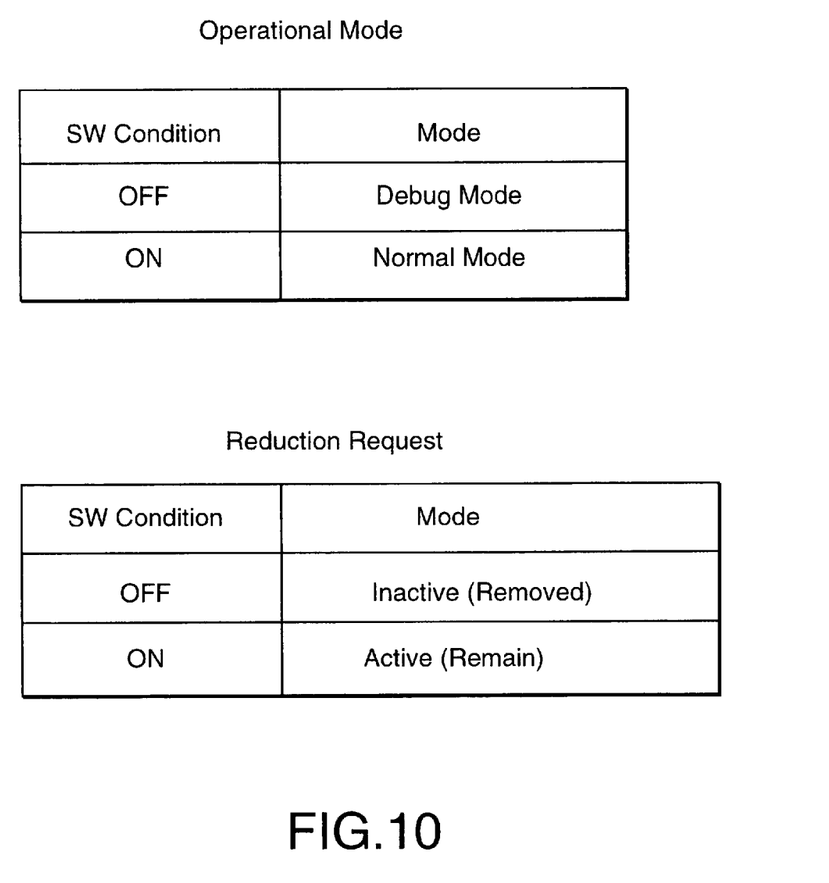
FIG. 10 is tables showing an operational mode and a reduction request in the terminal illustrated in FIG. 9.
Figure 11:
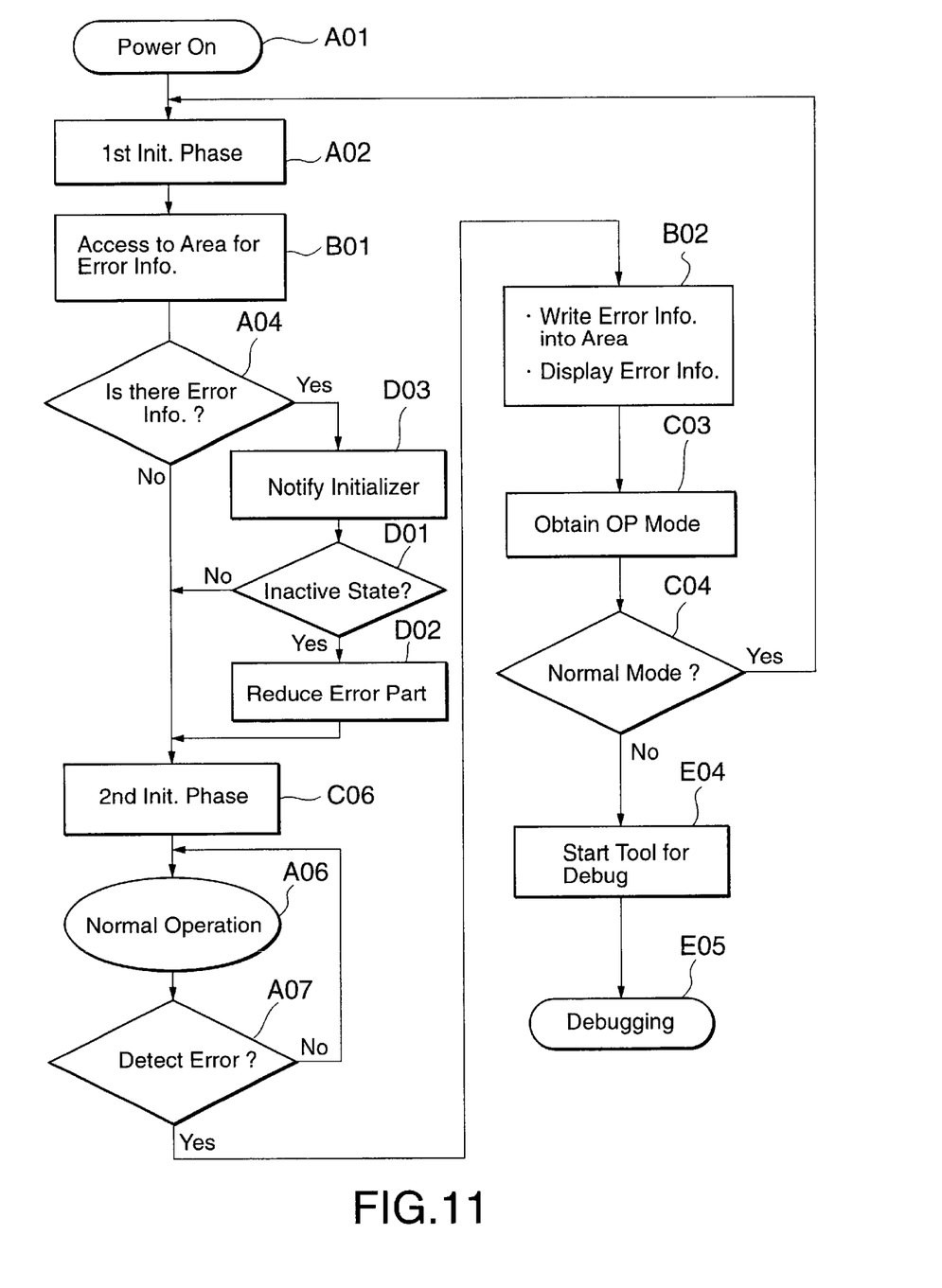
FIG. 11 is a flowchart for use in describing of the terminal illustrated in FIG. 9.

Now, a description will be made about a terminal according to a fourth embodiment of the present invention, with reference to FIGS. 9 through 11.

Figure 9:
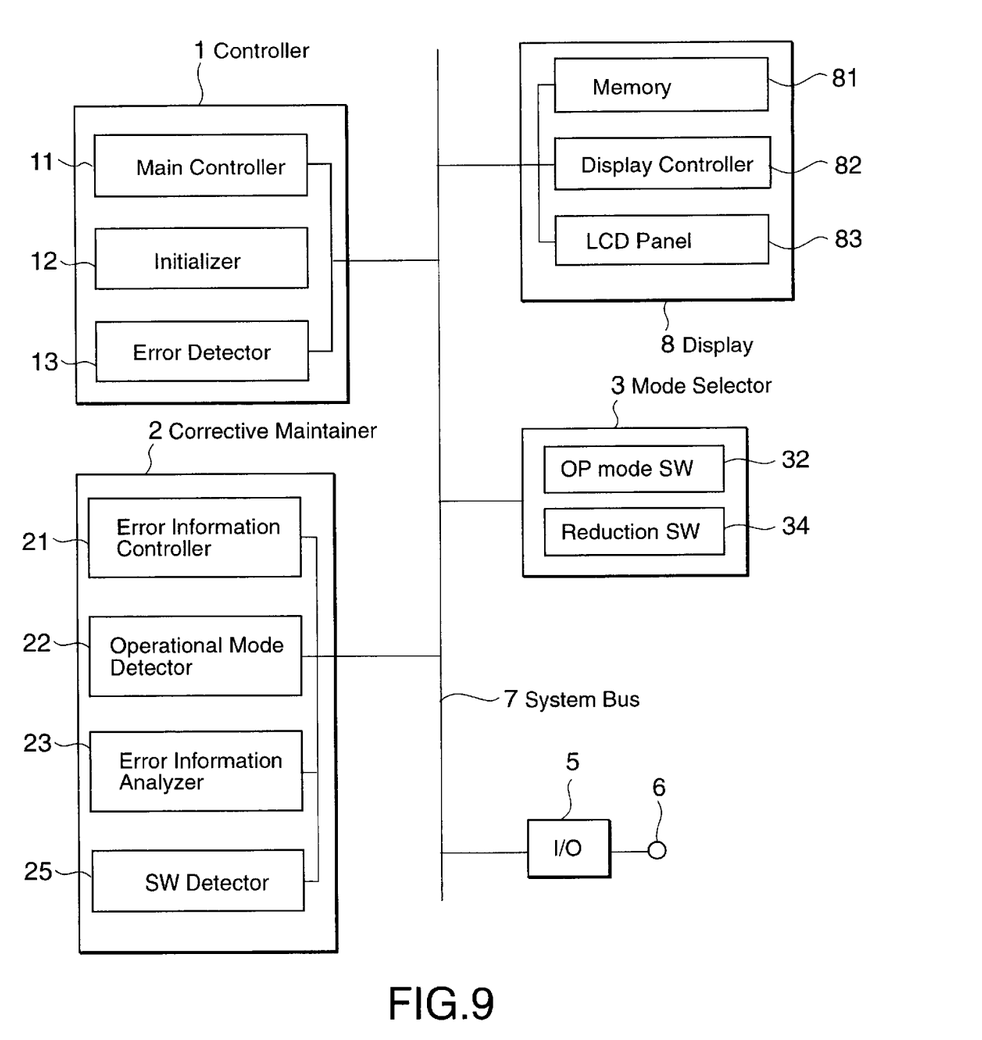
FIG. 9 is a block diagram schematically showing a terminal according to a fourth embodiment of the present invention.

Referring to FIG. 9, the terminal according to the fourth embodiment is a modification of the third embodiment. In detail, the terminal according to the fourth embodiment comprises a mode selector 3 having an operational mode switch 32 and a reduction switch 34. The operational mode switch 32 functions as the same way of the third embodiment. As shown in FIG. 10, the reduction switch 34 is for switching between two switch conditions which indicate an active state and an inactive state, respectively. In the active state, the initializer 12 starts the terminal with no reduction of the function. In the inactive state, the initializer 12 starts the terminal without the function or the error part relating to an error. That is, the error part is functionally removed from the terminal if the reduction switch 34 indicates the inactive state. For example, the initializer 12 starts the terminal with the display 8 being functionally removed if the display 8 has an error. These switches 32 and 34 can be manually switched by the operator. The switch detector 25 is for detecting the switch condition of the reduction switch 34.

Now, an explanation will be made about an operation of the terminal according to the third embodiment, with reference to FIG. 11.

In this embodiment, the normal starting process is carried out in the same way of the first embodiment. When the power is supplied to the terminal (Step A01), the initializer 12 carries out the first initialization phase (Step A02). Then the initializer 12 notifies the error information analyzer 23 of the completion of the first initialization phase so that the error information analyzer 23 accesses to the area assigned for an error information (Step B10). In addition the error information analyzer 23 judges whether or not an error information is stored in the area (Step A04). In the starting process, the judgement results in "No." The judgement is informed to the initializer 12, so that the initializer 12 carries out the second initialization phase (Step C06). After carrying out the second initialization phase, the main controller 11 controls the normal operation (Step A06).

During the normal operation, the error detector 13 periodically monitors the terminal and judges whether or not an error occurs in the terminal (Step A07). As the result of judgement, if detecting an error occurrence, the error detector 13 notifies the error information controller 21 of the error information relating to the error. Responsive to the notification, the error information controller 21 writes the error information about the error into the area secured in the memory 81 (Step B02). In addition, the error information controller 21 tells the completion of the writing to the operational mode detector 22 and the display controller 82. The display controller 82 controls the LCD panel 83 to visually display the error information of the memory 81 on the LCD panel 83.

The operational mode detector 22 detects the switch condition of the operational mode switch 32 to obtain the operational mode (Step C03), and judges whether or not the selected operational mode is the normal mode (Step C04). As the result of judgement if the selected operational mode is the normal mode, the operational mode detector 22 outputs an initialization request into the initializer 12.

The initializer 12 executes the first initialization phase in response to the initialization request from the operational mode detector 22 (Step A02). After the first initialization phase, the error information analyzer 23 accesses to the area for the error information (Step B01), and judges whether or not an error information is stored in the area (Step A04). In this event, the judgement results in "Yes." Therefore, the error information analyzer 23 notifies the error occurrence to the initializer 12 and the switch detector 25 (Step D03).

Responsive to the notification of the error occurrence, the switch detector 25 detects the switch condition of the reduction switch 34, so as to judge whether or not the reduction switch 34 indicates the inactive state (Step D01). If the reduction switch 34 indicates the inactive state, the initializer 12 reduce the error part where the error occurs (Step D02). Otherwise, the initializer 12 does not reduce the error part. That is, the inactive state forbids the initializer 12 to start the error part, while the active state causes the initializer 12 to function as the same way of the other embodiments.

Then the initializer 12 carries out the second initialization phase (Step C06). It is noted here that the second initialization phase of this embodiment is as same as the second initialization phase of the foregoing third embodiment. That is, the second initialization phase of the fourth embodiment does not include the deleting of the error information.

After the second initialization phase, the controller 11 controls the normal operation (Step A06), and the error detector 13 periodically monitors the terminal (Step A07).

As for the case where the selected mode is the debug mode in the judgement of Step C03, the terminal according to the fourth embodiment operates in the same manner of the second embodiment. In this connection, the operator can behave as disclosed in the second embodiment.

While the invention has been particularly shown and described with respect to preferred embodiments thereof, it will be understood by those skilled in the art that changes in form and details may be made therein without departing from the scope and spirit of the invention. For example, although the terminal according to the first embodiment comprises the register 31, the terminal of the first embodiment may comprise the operational mode switch instead of the register.

What is claimed is:

1. A terminal which processes an error occurring in the terminal in accordance with a mode selected by a user from among a normal mode and a debug mode, said terminal comprising:

a mode information holder adapted to hold mode information that indicates which mode is the selected mode;

an error detector adapted to detect an error occurring in the terminal;

a mode judge unit adapted to judge which mode is the selected mode when the error detector detects the error, by referring to the mode information, the mode judge unit producing an initialization request if the normal mode is the selected mode, while the mode judge unit does not produce the initialization request if the debug mode is the selected mode; and an initializer which initialize the terminal in response to the initialization request;

wherein the mode information holder comprises a register adapted to store, as the mode information, a flag indicative of either one of the normal mode and the debug mode, and wherein the initializer carries out initialization which comprises a first initialization phase and a second initialization phase carried out after the first initialization phase, the terminal further comprising:

a memory which is selectively put into a hold state and a release state;

an error information controller adapted to write error information into the memory when the error detector detects the error;

an error information analyzer adapted to judge whether or not the memory stores the error information after the initializer carries out the first initialization phase, the error information analyzer notifying the initializer of the judgement;

an information switch adapted to switch between two switch conditions which indicate the hold state and the release state, respectively; and a switch detector adapted to detect the switch condition of the information switch to notify the initializer of the switch condition so that, if the switch condition indicates the hold state in a condition that the memory stores the error information, the initializer keeps the memory storing the error information and then carries out the second initialization phase.

2. A terminal as claimed in claim 1, the terminal being connected with an outer analyzer when the error is analyzed, wherein:

the error information analyzer reads the error information out of the memory after the initializer carries out the first initialization phase, and analyzes the error on the basis of the error information to produce detailed error information and to notify the detailed error information to the outer analyzer.

3. A terminal as claimed in claim 1, further comprising a main controller adapted to control a normal operation of the terminal after the second initialization phase, the error detector periodically monitoring the terminal so as to tell an error occurrence to the error information controller if detecting the error.

4. A terminal as claimed in claim 3, further comprising a display unit and a display controller, wherein the error detector also notifies the display controller of the error occurrence when detecting the error, so that the display controller controls the display unit to visually display the error information on the display unit.

5. A terminal which processes an error occurring in the terminal in accordance with a mode selected by a user from among a normal mode and a debug mode, said terminal comprising:

a mode information holder adapted to hold mode information that indicates which mode is the selected mode;

an error detector adapted to detect an error occurring in the terminal;

a mode judge unit adapted to judge which mode is the selected mode when the error detector detects the error, by referring to the mode information, the mode judge unit producing an initialization request if the normal mode is the selected mode, while the mode judge unit does not produce the initialization request if the debug mode is the selected mode; and an initializer which initialize the terminal in response to the initialization request;

wherein the mode information holder comprises a register adapted to store, as the mode information, a flag indicative of either one of the normal mode and the debug mode, A terminal which processes an error occurring in the terminal in accordance with a mode selected by a user from a among a normal mode and a debug mode, said terminal comprising:

a mode information holder adapted to hold mode information that indicates which mode is the selected mode;

an error detector adapted to detect an error occurring in the terminal;

a mode judge unit adapted to judge which mode is the selected mode when the error detector detects the error, by referring to the mode information, the mode judge unit producing an initialization request if the normal mode is the selected mode, while the mode judge unit does not produce the initialization request if the debug mode is the selected mode; and an initializer which initialize the terminal in response to the initialization request;

wherein the mode information holder comprises a register adapted to store, as the mode information, a flag indicative of either one of the normal mode and the debug mode, and wherein the initializer carries out initialization which comprises a first initialization phase and a second initialization phase carried out after the first initialization phase, the terminal further comprising:

a memory;

an error information controller adapted to write an error information into the memory when the error detector detects the error, the error information being indicative of an error part of the terminal that is selectively put into an active state and an inactive state;

an error information analyzer adapted to judge whether or not the memory stores the error information after the initializer carries out the first initialization phase, the error information analyzer notifying the initializer of the judgement;

a reduction switch adapted to switch between two switch conditions which indicate the active state and the inactive state, respectively; and a switch detector adapted to detect the switch condition of the reduction switch to forbid the initializer to start the error part if the switch condition indicates the inactive state, so that the initializer carries out the second initialization phase with the error part being functionally reduced.

6. A terminal as claimed in claim 5, the terminal being connected with an outer analyzer when the error is analyzed, wherein:

the error information analyzer reads the error information out of the memory after the initializer carries out the first initialization phase, and analyzes the error on the basis of the error information to produce detailed error information and to notify the detailed error information to the outer analyzer.

7. A terminal as claimed in claim 5, further comprising a main controller adapted to mainly control a normal operation of the terminal after the second initialization phase, the error detector periodically monitoring the terminal so as to tell an error occurrence to the error information controller if detecting the error.

8. A terminal as claimed in claim 7, further comprising a display unit and a display controller, wherein the error detector also notifies the display controller of the error occurrence when detecting the error, so that the display controller controls the display unit to visually display the error information on the display unit.

\* \* \* \* \*